United States Patent [19]

Wallace et al.

[11] Patent Number: 5,581,769

[45] Date of Patent: Dec. 3, 1996

[54] MULTIPURPOSE PROGRAM OBJECT LINKAGE PROTOCOL FOR UPWARD COMPATIBILITY AMONG DIFFERENT COMPILERS

[75] Inventors: William D. Wallace, Toronto, Canada; Michael T. Wheatley, San Jose, Calif.

[73] Assignee: International Business Machines Corporation, Armonk, N.Y.

[21] Appl. No.: 527,465

[22] Filed: Sep. 13, 1995

Related U.S. Application Data

[63] Continuation of Ser. No. 175,329, Dec. 29, 1993, abandoned.

[51] Int. Cl.⁶ .................................................... G06F 9/44
[52] U.S. Cl. .......................... 395/684; 364/DIG. 1; 364/280.4; 364/280
[58] Field of Search .................................................. 395/700

[56] References Cited

U.S. PATENT DOCUMENTS

| | | | |
|---|---|---|---|
| 4,302,820 | 11/1991 | Struger et al. | 364/900 |
| 4,712,189 | 12/1987 | Mohri | 364/900 |
| 4,736,321 | 4/1988 | Brown et al. | 364/300 |
| 4,779,187 | 10/1988 | Letwin | 364/200 |
| 4,868,745 | 9/1989 | Patton et al. | 364/200 |
| 4,961,133 | 11/1990 | Talati et al. | 364/200 |
| 5,027,273 | 6/1991 | Letwin | 364/200 |
| 5,097,533 | 3/1992 | Burger et al. | 395/500 |
| 5,146,593 | 9/1992 | Brandle et al. | 395/700 |
| 5,175,856 | 12/1992 | Van Dyke et al. | 395/700 |
| 5,179,702 | 1/1993 | Spix et al. | 395/650 |
| 5,210,876 | 5/1993 | Uchida | 395/700 |
| 5,269,021 | 12/1993 | Denio et al. | 395/700 |
| 5,339,419 | 8/1994 | Chan et al. | 395/700 |

*Primary Examiner*—Kevin A. Kriess
*Assistant Examiner*—Lucien Zopaw
*Attorney, Agent, or Firm*—Baker, Maxham, Jester & Meador

[57] ABSTRACT

A multipurpose linkage protocol for procedural calls between compiled program objects permitting a calling program to call a single named entry point in another program at one of several different offsets each corresponding to a different linkage convention. This multipurpose linkage technique permits introduction of new program linkage conventions while retaining linkage compatibility with previously compiled program objects, without compromising either compatibility or the efficiency of the new convention. Every program object supporting this multipurpose linkage protocol may be entered at one of a set of defined offsets from any named entry point. Entry by the calling routine at a particular offset indicates a specific type of call, such as a normal entry by a call to a mainline routine. Thus, a supporting program object can be entered by earlier-compiled objects at the usual +0 Byte offset to handle the call accordingly or it can be entered at a different +16 Byte offset to handle the call according to a newer, more efficient linking procedure. The multipurpose linkage protocol of this invention is suitable for standardization across many high-level languages.

8 Claims, 3 Drawing Sheets

MULTIPURPOSE PROGRAM OBJECT LINKAGE PROTOCOL FOR UPWARD COMPATIBILITY AMONG DIFFERENT COMPILERS

This application is a continuation of application U.S. Ser. No. 08/175,329, filed Dec. 29, 1993, now abandoned.

BACKGROUND OF THE INVENTION

1. Field of the Invention

This invention relates generally to computer systems and specifically to techniques for linking compiled executable binary program objects for procedure calls.

2. Description of the Related Art

Higher-level program languages provide facilities for making procedure calls, whereby reusable procedures can be compiled in executable form and stored as program objects in a defined location for execution on demand. Such program objects can pass and receive parameters and the results of procedure calls. As used herein, the term procedure in a generic sense means a series of steps, including program segments, functions, subroutines and portions thereof. A program object herein denominates an executable binary code produced by a compiler responsive to a high-level language procedure.

Details of procedure call conventions may differ among various high-level source languages because they are determined by language requirements, operating system conventions and debug requirements. Compatible procedure calls must be made to procedures originally written in the same language or in another language using the same calling or linking protocol. A call to a procedure originally written in a different language may require special steps to ensure that the call is compatible with the original linking or calling protocol. When different linking protocols are used in the original compilations, the necessary restructuring usually requires modification of call procedures at the machine language level.

In many computer systems, including virtually all large and medium size systems, common libraries of procedures are maintained for standard, often-used functions. These procedures are called from application programs, thereby freeing the application programmer from writing and debugging the code required to perform such common functions. Depending on the system design, library functions can be linked to such an application program at link time or they may be dynamically linked at execution time if such activity is supported by the system.

Such large systems are subject to upgrades on a continuing basis and application upgrades or improvements must link to the many pre-compiled program objects already debugged and operating in the system. Cooperating application programs require efficient mechanisms that enable execution control and data to be passed to other procedures. These mechanisms are considerably more complex and less efficient when they must also provide support for the older existing programs that cannot be recompiled to conform to a newer (e.g., more efficient) linking protocol. Accordingly, there is a clearly-felt need in the art for procedural call techniques for introducing improved linking protocols without compromising upward compatibility with existing pre-compiled program objects.

Practitioners in the art have often suggested improvements intended to overcome processing inefficiencies arising from incompatible source languages and linkage protocols. A linkage protocol herein denominates a set of rules, conventions or procedures used by cooperating program objects that facilitates transfer of execution control and data when one program object calls another and when execution control is returned from that call. Normally, linkage protocols are strongly dependent on the hardware and operating system facilities available in the application program operating environment. Linkage protocols vary widely on different hardware and software platforms. Moreover, even on a specific hardware/operating-system platform, several different linkage protocols may be used in different programming languages or different application systems.

For instance, the International Business Machines Corporation (IBM) System/370 hardware platform and the IBM MVS and VM operating systems embrace several linkage protocols. One simple linkage protocol, denominated the "OS Linkage Convention", is widely used. Extensions to and variations of the OS Linkage Convention are employed by applications written in several high-level languages implemented on the System/370 platform. Such variations and extensions are required because the facilities supported by the OS Linkage Convention are insufficient to support all constructs required by newer high-level languages. High-level languages such as COBOL, Fortran, PL/I and C require explicit or implicit specification of several elements making up the linkage between a calling object and a called object. These include the basic system operation elements of (a) a pointer to the entry point of the called object, (b) a pointer to the return location in the calling object, (c) pointers to or values of data items to be passed between the objects, and (d) pointers to or values of descriptive information relating to the data items passed between the objects, such as string length, array size, and the like.

Specification of additional elements unique to a particular high-level language may include such items as (a) identification of the "scope" of the called object in the form of a pointer to the "static data" used thereby, (b) identification of the "global scope" of the overall application program in the form of a pointer to the global information required by the application program environment, and (c) a pointer to a storage area for temporary or local data storage by the called object, often implemented as a "stack". Each of the high-level languages implemented on System/370 and other hardware platforms defines a set of conventions by which such information is passed between cooperating routines written in the same language.

Finally, linkage protocols are often used for a variety of purposes in a variety of circumstances. Although commonly used to support subroutine calls in a high-level language, other linkage protocol uses include (a) calls to a mainline program from the operating system or a subsystem or from another application program, (b) calls to operating system or subsystem services from an application program, and (c) calls between an application program and a library routine providing services intrinsic to the language in which the program is written, such as math routines. In some situations, it is very useful to be able to distinguish in the called routine the circumstances under which it was called, such as where the type of call may require different entry conditions or where initialization is required on certain calls but not on others. A capability in the called routine to distinguish the type of call may be essential for certain processing but may unnecessarily reduce performance efficiency in the usual case not requiring such information. Overall efficiency is compromised where additional logic is inserted in each call to distinguish the call from others for special processing.

It is known in the art that many program objects consist of a single routine and others include many executable routines. In a program object consisting of many routines, one such routine may call another within the same object or a program object may be called from another independent object or from the Operating system or subsystem under which it runs. Each program routine typically provides at least one "entry point" or "name" for access. An entry point herein denominates a spot within the program object at which the processing begins. Some high-level languages such as PL/I permit the user to name multiple entry points within a single program object. Calling, programs then can pass control to a selected entry point in the object to begin the processing peculiar to that entry point.

Most programs written in high-level languages incorporate instructions and information in a compiled program object at each entry point, such instructions being herein denominated a "prologue". These prologues typically provide routine housekeeping such as saving the caller's environment and setting up for execution of the called routine. Prologues may also contain information that identifies the called routine, such as the routine name, language, compile date and the like. This information is commonly used for debugging or problem analysis.

It is known in the art to store a processed version of the source code with the compiled object for retranslation to machine code to accommodate linkage protocol revisions. Also, it is known to provide microcoded prologue and epilogue instructions for execution under single high-level instructions employed by compilers in some systems, where linkage protocol revisions are accommodated by inserting new microcode to support existing objects. However, because the linking conventions implemented by different high-level languages typically differ from one another, making difficult the construction of efficient heterogenous applications in which a routine written in one language with one linking protocol calls a routine written in another language with another linking protocol, the efficient application of a prologue procedure to improve linkage protocol efficiency without sacrificing upward compatibility was until now unknown in the art. These difficulties have motivated practitioners in the an to suggest a variety of methods for facilitating construction of heterogenous applications where a routine written in one high-level language calls routines written in other high-level languages.

For instance, in James A. Brown et al. U.S. Pat. No. 4,736,321, disclose a method for executing external processes and accessing external data from within an interactive language workspace. The workspace task referring to the external processes or data is synchronized and locked until the process is completed or the data retrieved. Brown et al. teach the use of a "third-party" program object for mediating calls between dissimilar protocols, locking the caller and forcing the return data to be acceptable to the caller before completing the call. Unfortunately, their method doesn't consider the optimization of linkage efficiency in a multi-object data processing system.

Similarly, in Richard T. Brandle et al. U.S. Pat. No. 5,146,593, disclose a system software interface that is called by application programs using a standard protocol. All calls to system library routines are made through this interface and, when called, the interface determines the location and original language of a desired library procedure. The interface then sets up parameters and calls the procedure using the calling convention that it expects. The same interface receives results generated by the library procedure and converts them to the convention expected by the calling application, returning the results in the proper format to the calling application. Unfortunately, the technique disclosed by Brandle et al. involves substantial additional execution overhead (application inefficiency), which is a penalty normally expected in the art when absolutely enforcing compatibility among several high-level languages. They neither consider nor suggest methods for enforcing compatibility without compromising processing efficiency.

Great care is required in designing a common linkage convention to ensure that the needs of each language are satisfied and that the overall application performance efficiency is satisfactory, particularly for call-intensive applications. Practitioners in the art have suggested many schemes for enhanced efficiency in call-intensive applications.

For instance, in Kiritkumar Talati et al. U.S. Pat. No. 4,961,133, disclose a method for providing a virtual execution environment on a target computer using a virtual software machine. Their system provides application program portability and consistency across a number of different hardware/operating-system environments by pre-compilation of the application software. Also, in George A. Spix et al. U.S. Pat. No. 5,179,702, disclose an integrated software architecture for highly-parallel multi-processor systems that proposes useful methods for the efficient control of programs in a highly-parallel multi-processor environment through optimized program object linkage techniques.

In Don A. VanDyke et al. U.S. Pat. No. 5,175,856, disclose an integrated hierarchical representation (IHR) of program objects as a common intermediate representation for compiling source code programs written in one or more procedural programming languages into a single executable program object file. Their IHR protocol is language-independent and suitable for sharing by all software system components. Finally, in James Letwin U.S. Pat. Nos. 4,779,187 and 5,027,273, discloses a method and operating system for executing programs in a multi-mode microprocessor that teaches methods for improved operation efficiency in a multi-mode environment based on optimized mode-switching techniques.

Despite the availability in the art of many such cleverly-engineered hardware and operating system features for enhancing program object procedural calling efficiency, improved efficiency is usually obtained at the expense of seamless compatibility with other previously-supported linkage conventions. Thus, improved linkage protocol efficiency does not itself meet the clearly-felt need in the art for a method that implements such improved efficiency without compromising upward compatibility with existing linkage protocols. Such compatibility is prized because existing compiled program objects can then be combined with newly-written or newly-compiled program objects that conform to and require a new (more efficient) linkage convention. The capability to mix and match old and new program objects is highly desirable in large systems having a substantial body of older debugged objects, where the source code for such old routines is not available for re-compile or where the overall application is so complex that complete re-compilation in a single operation is discouraged.

Accordingly, there is a clearly-felt need in the art for a method permitting introduction of a new efficient program object linkage protocol into existing systems without compromising upward compatibility with previously compiled program objects and without compromising the new protocol efficiency. The related problems and deficiencies are clearly felt in the art and are solved by this invention in the manner described below.

SUMMARY OF THE INVENTION

The system of this invention employs a new multipurpose linkage protocol permitting each program object to be entered at any one of a set of defined offsets from each named entry point. Entry of a called object by a calling object at a particular offset indicates a particular type of call and the called object is expected to conform to the linkage convention peculiar to that particular type of call. Thus, any program object supporting this technique can be entered at any of several predetermined offsets from any of its named entry points using any of several different linkage conventions. The system of this invention supports the existing linkage conventions used by older existing programs without compromising the efficiency of a new optimized linkage convention.

It is an object of this invention to support implementation of efficient linkage mechanisms for use in call-intensive applications. It is a feature of this invention that branching and external code execution is not necessary for compatible handling of new highly-efficient linkage protocols. It is another feature of this invention that the processing within an application program routine may start at several different locations relative to the named entry point.

It is also an object of this invention to provide uncompromised support for new (more efficient) linkage conventions while retaining uncompromised support for existing linkage conventions. It is another feature of this invention that external code execution is unnecessary for compatible handling of existing linkage protocols in new program objects.

It is yet another object of this invention to permit a called routine to efficiently distinguish between several different types of calls. It is an advantage of the method of this invention that providing a set of defined offsets from a named entry point allows efficient processing while retaining the capability to locate program identification information close to the beginning of the program.

It is another object of the method of this invention to provide multiple program object starting points without defining additional named entry points. It is an advantage of the method of this invention that no additional named entry points are necessary, thereby avoiding the addition of new externally-exposed names requiring processing by a linkage editor and other related tools with a corresponding loss of linking efficiency.

It is also an object of this invention to formalize a multiple-offset entry-point linkage protocol for application to many different high-level language compilers. In a preferred embodiment of the multipurpose linkage protocol of this invention, a new efficient linkage convention is specified by entering at a +16 Byte offset from the named entry point of the called object. The called object is structured to branch from a +0 Byte offset from the named entry point to execute an "old prologue" for correct processing of calls from existing program objects conforming to an existing linkage convention that links directly to the named entry point. The called object contains instructions at the +16 Byte offset that support a new efficient linking protocol without branching or testing instructions that would reduce linkage efficiency. This linkage protocol embodiment defines a standard (existing) linkage convention and an efficient (new) linkage convention that are independent of the high-level language in which the program application is written and thus permit implementation of hybrid applications consisting of program objects complied from several languages.

It is yet another object of the multipurpose linkage protocol of this invention to support modern application program constructs such as re-entrancy and recursion. The multiple offset architecture of this invention can be included at any number of named entry points in a program application and, accordingly, represents an unexpectedly advantageous extension to the multiple-named entry-point techniques known in the art for application programs. As used herein, contrary to practice in the existing art, a "named entry point" in an application program routine denominates a location within a program object relative to which processing may begin and does not necessarily denominate a point in a program object at which processing begins.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DESCRIPTION OF THE PREFERRED EMBODIMENTS

Figure 1:
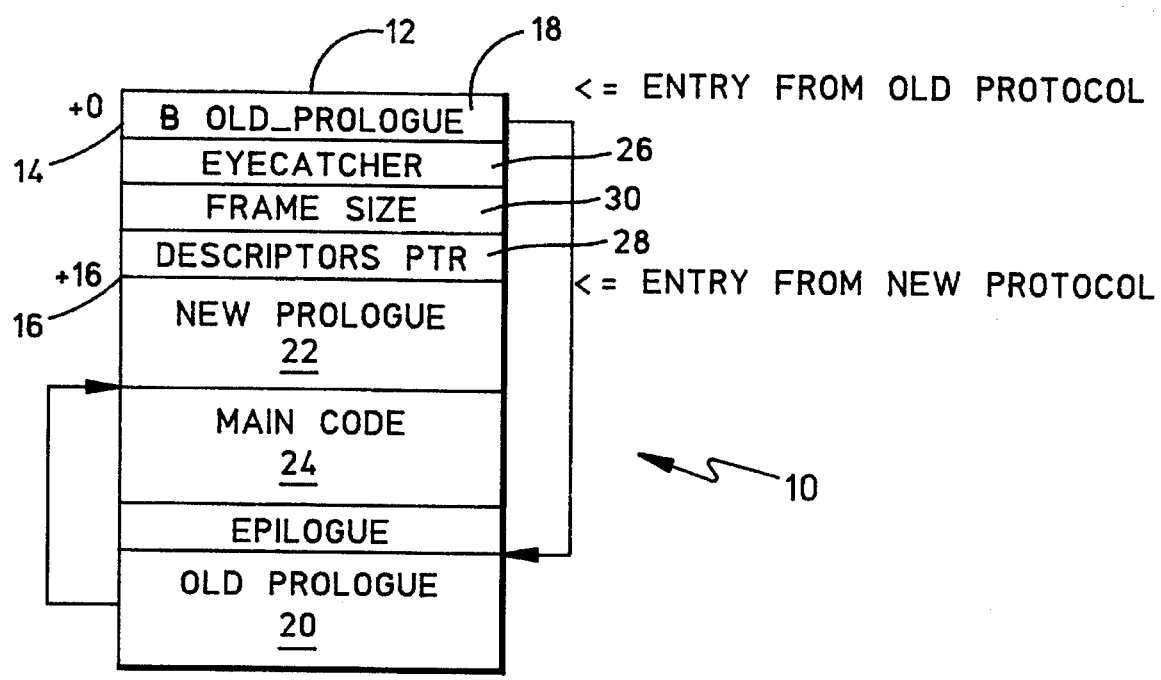
FIG. 1 is a descriptive block diagram of an exemplary embodiment of the dual-offset entry-point linkage module of this invention.

FIG. 1 illustrates the fundamental feature of this invention, which is that each program object compiled to support this invention may be entered at a plurality of defined offsets from each named entry point. FIG. 1 shows a block diagram of an exemplary program object 10 structured in accordance with the multipurpose linkage protocol of this invention. Program object 10 is shown with an entry point 12 and two offsets 14 and 16 at +0 Bytes and +16 Bytes, respectively. Entry by a calling routine at a selected offset from the named entry point 12 indicates a specific type of call. For example, in FIG. 1, entry at offset 14 indicates a "normal" entry from a program object in accordance with an "old" linkage protocol. Similarly, entry at offset 16 indicates a call from a program object conforming to a "new" linkage protocol, which may employ higher efficiency linkage procedures than are available from "old" linkage protocols.

Although program object 10 in FIG. 1 provides only two offsets from named entry point 12, the multipurpose linkage protocol of this invention may provide any number of such offsets at each of any plurality of named entry points in a single program object. It is an essential element of the protocol of this invention that "offsets" are used at each named entry point instead of additional named entry points. This permits the multipurpose linkage protocol to be employed in newly-compiled program objects without requiring recompilation of existing program objects employing "old" linkage protocols to link up such "new" entry point names. Thus, the multipurpose linkage protocol of this invention allows a new (e.g., more efficient) linkage convention to be introduced in "new" program objects permitting "new callers" to enter at offset 16 from named entry point 12 while retaining support for existing callers by accepting entry at offset 14 from entry point 12 structured with instruction 18 branching to old prologue 20. A new prologue 22 at offset 16 and branch instruction 18 allow for the correct processing of calls from both "old" and "new" callers.

Because new prologue 22 is executed without branching immediately upon entry at offset 16 and the main code 24 executes immediately upon completion of new prologue 22 without branching, the "new" linkage protocol avoids overhead associated with branching steps, thereby ensuring no compromise of processing efficiency for the "new" linkage protocol. Conversely, the "old" linkage protocol is serviced at offset 14 with old prologue 20, which branches to main code 24 upon completion, thereby servicing the "old" program object caller without compromising compatibility. Thus, for these reasons and for the reasons discussed below, the multipurpose linkage protocol of this invention, for the first time, offers uncompromised upward compatibility in combination with uncompromised improvement in linkage efficiency without recompilation (relinking) of existing program objects.

Another important element of the multipurpose linkage protocol of this invention is its independence of the high-level language in which the program object is written. Thus, the method of this invention enables the implementation of hybrid applications consisting of multiple languages. Finally, these protocols also support modern application program constructs such as re-entrancy and recursion.

The inventors have developed a preferred embodiment of this invention for use with System/370 application programs as part of the Common Execution Environment (CEE). This embodiment (see FIGS. 2–3) requires enabled callers ("trusted" callers) to enter the called routine at offset +16 Bytes from the defined entry point of that routine and presumes that, upon entry, the caller has passed all of the information necessary for the-subroutine call in a pre-described fashion. When entered at A+16B offset representing offset 16 from defined entry point 12 in FIG. 1, a CEE-conforming called routine 34 in FIGS. 2 and 3 can presume that it is being called for subroutine execution and that all of the information it requires from the calling routine 32 is provided in the predescribed fashion. If called routine 34 is entered at A+0B offset representing offset 14 from entry point 12 in FIG. 1, it assumes that caller 32 is not conforming to the new linkage convention and that (a) the call may be a subroutine call from a subroutine written in the same language using an earlier (old) linkage convention, or (b) the call may be from the operating system or subsystem in which the application program is executing.

Typically, as seen in FIG. 1, program object 10 performs minimal housekeeping when entered at offset 16, and new prologue 22 then proceeds immediately to main code 24. When entered at offset 14, however, program object 10 must first determine the type of call, perform logic specific to that type of call, set up the environment (e.g., gain access to the programming environment and its stack and static areas), perform housekeeping, and finally join main code 24.

Program objects conforming to the CEE multipurpose linkage protocol typically support access at offset 16 for "new" callers and offset 14 for "old" callers. At offset 14, branch instruction 18 is coded to cause control to be transferred to old prologue 20 for old callers. This leaves the area between +4 Bytes and +16 Bytes free for other purposes, such as storing rudimentary identification information including an eye-catcher 26 identifying program object 10 as one which supports multipurpose linkages and a descriptors pointer 28 to additional identification information. Such a structure, beginning a routine with a branch instruction (to an old prologue) followed by information that identifies the routine for debugging and other purposes, is typical of applications produced by high-level languages on System/370. Nonetheless, this structure is not optimal if the program immediately executes a valueless branch instruction at entry 14. One of the advantages of this invention is that the normal path for entry to a routine can be defined as something other than the usual +0 Bytes offset from its named entry point 12. This arrangement retains the benefit of positioning identifying information close to the named entry point while avoiding unnecessary instructions in the normal frequent-entry path.

The "double-headed" module in FIG. 1 provides a number of significant advantages. These advantages include the implementation of CEE-enabled prologue 22 without an initial branch instruction, thus improving call performance. It also permits program object 10 to be entered at offset 14 by non-CEE or pre-CEE callers so that both CEE and non-CEE prologues can be optimized for improved call performance. This architecture permits separation of different types of entries in certain types of circumstances. For example, it is expected that the operating system will enter at offset 14 (+0 Bytes), while calls from CEE-enabled modules will enter at offset 16 (+16 Bytes). In languages such as COBOL, where the same routine can act as a main program or procedure, this capability permits specialization and optimization of the different prologues and therefore permits improved call performance. Because non-CEE-enabled routines are expected to enter at offset 14, "bilingual" modules can be implemented that may be called without glue code from CEE-enabled and non-CEE-enabled routines. Finally, a portion of the first 16 bytes in the module is available for eye-catcher 26, pointer 28 and a key constant (stack frame size) 30, making them available for use by the prologues.

The Common Execution Environment (CEE)
Linkage Protocol Embodiment

The CEE inter-procedure linkage conventions are now described in detail. The new optimized linkage (OPLINK convention) developed by the inventors for System/370 provides a set of common linkage conventions for System/370 high-level languages that is compatible between languages and also compatible with other parts of the CEE environment, such as exception handling. The OPLINK convention efficiently accommodates old object code and compilers with little effect on existing compiled code and provides higher performance efficiency in linking two supported program objects.

Figure 2:
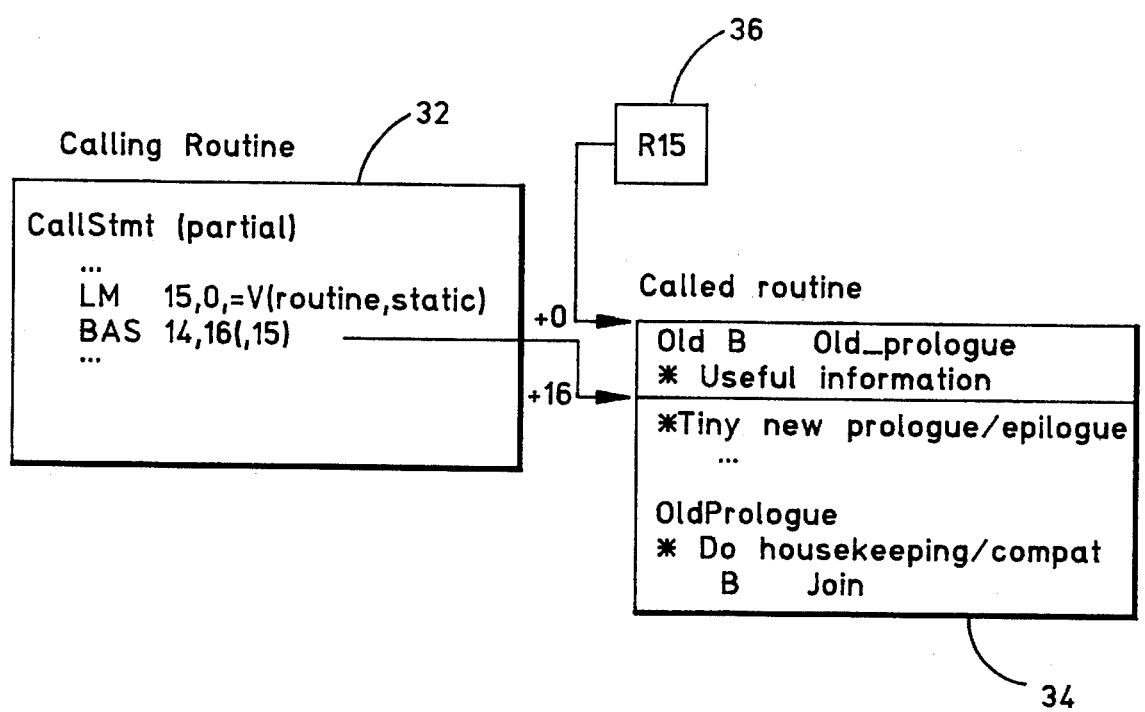
FIG. 2 is a descriptive block diagram of the multipurpose linkage protocol of this invention including the dual-offset entry-point embodiment from FIG. 1.

FIG. 2 provides an outline of the OPLINK convention showing a linkage between calling routine 32 and called routine 34. As discussed above in connection with FIG. 1, CEE-enabled callers must enter called routine 34 at its new prologue (+16 Byte offset) and non-CEE-enabled callers must enter called routine 34 at its old prologue (+0 Bytes offset).

A number of constraints on the overall CEE environment also apply particularly to the OPLINK convention. For applications built using a single high-level language that are recompiled with a CEE-enabled compiler, the semantics remain unchanged. A single re-bind is sufficient to run old code in the CEE environment. Only one application recompile is necessary to take advantage of CEE enhancements.

OPLINK facilitates the passing of control and parameters between cooperating routines to support the CEE design for re-entrancy and recursion, and to maximize performance of procedure and library calls. Mixtures of CEE-enabled and non-CEE-enabled routines may be operated in a single application.

OPLINK is designed as a general-purpose linkage convention to be used by most high-level languages for calls within a compilation unit, between compilation units, and to call system services and non-CEE routines that are designed to cooperate with OPLINK conventions. OPLINK provides compatibility with pre-CEE linkage conventions and minimizes necessary compiler changes.

OPLINK is an extension of the Operating System (OS) linkage convention originating with System/360. The OS Standard Linkage convention supports procedure calls with the instructions provided in Table 1 below.

TABLE 1

OS Standard Linkage

| | | |
|---|---|---|
| GPR1 | => | a list of argument addresses, terminated with an address containing a 1 in its high order bit |
| GPR13 | => | an 18-word save area |
| GPR14 | => | the return point in the caller's routine |
| GPR15 | => | the entry point in the called routine |

The OPLINK linkage convention requires a CEE-enabled routine to prepare for a call by setting the registers as shown in Table 2 below.

TABLE 2

OPLINK Linkage

| | | |
|---|---|---|
| GPR1 | => | an argument list which may contain addresses and/or value arguments. Unlike the OS linkage convention, this list contains no explicit temination bit. |
| GPR12 | => | CAA, the key CEE control block |
| GPR13 | => | the Caller's stack frame in the CEE stack. Each such stack frame begins with an 18-word save area. |
| GPR14 | => | the return point in the calling routine |
| GPR15 | => | the entry point in the called routine |

With OPLINK, the caller enters the called routine at an offset of +16 Bytes from the called routine's named entry point, using the instruction: BAS 14,16,(,15). This technique permits the called routine's prologue to avoid an initial branch around the module identification and allows the first 16 Bytes of the called routine to be used as discussed above in connection with FIG. 1.

OPLINK conventions operate with a CEE-provided execution stack. The current stack pointer is maintained in GPR13. The prologue of a CEE-enabled routine may allocate space referred to as "frame" or "stack frame" in this stack for its own purposes and to support subsequent calls to other routines.

The OPLINK linkage convention implementation details are now described. The register 36 (FIGS. 2–3) conventions for OPLINK linkage conventions at entry and during execution of a CEE-enabled module are provided in Table 3 below.

TABLE 3

OPLINK Register Conventions

| | | |
|---|---|---|
| GPR1 | = | Address of argument list, or undefined if no arguments. Must be valid on entry if arguments are passed. Not preserved. |
| GPR2–11 | = | Undefined, preserved. |

TABLE 3-continued

OPLINK Register Conventions

| | | |
|---|---|---|
| GPR12 | = | CAA address. Must be valid on entry. Preserved. |
| GPR13 | = | Stack frame address. Must be valid at all times. |
| GPR14 | = | Return address. Must be valid on entry. Not preserved. |
| GPR15 | = | Entry point address. Must be valid on entry. Not preserved. |
| FPR0–6 | = | Undefined on entry. For functions with floating point (real or complex) result, contains result on exit, otherwise not preserved. |

Figure 3:
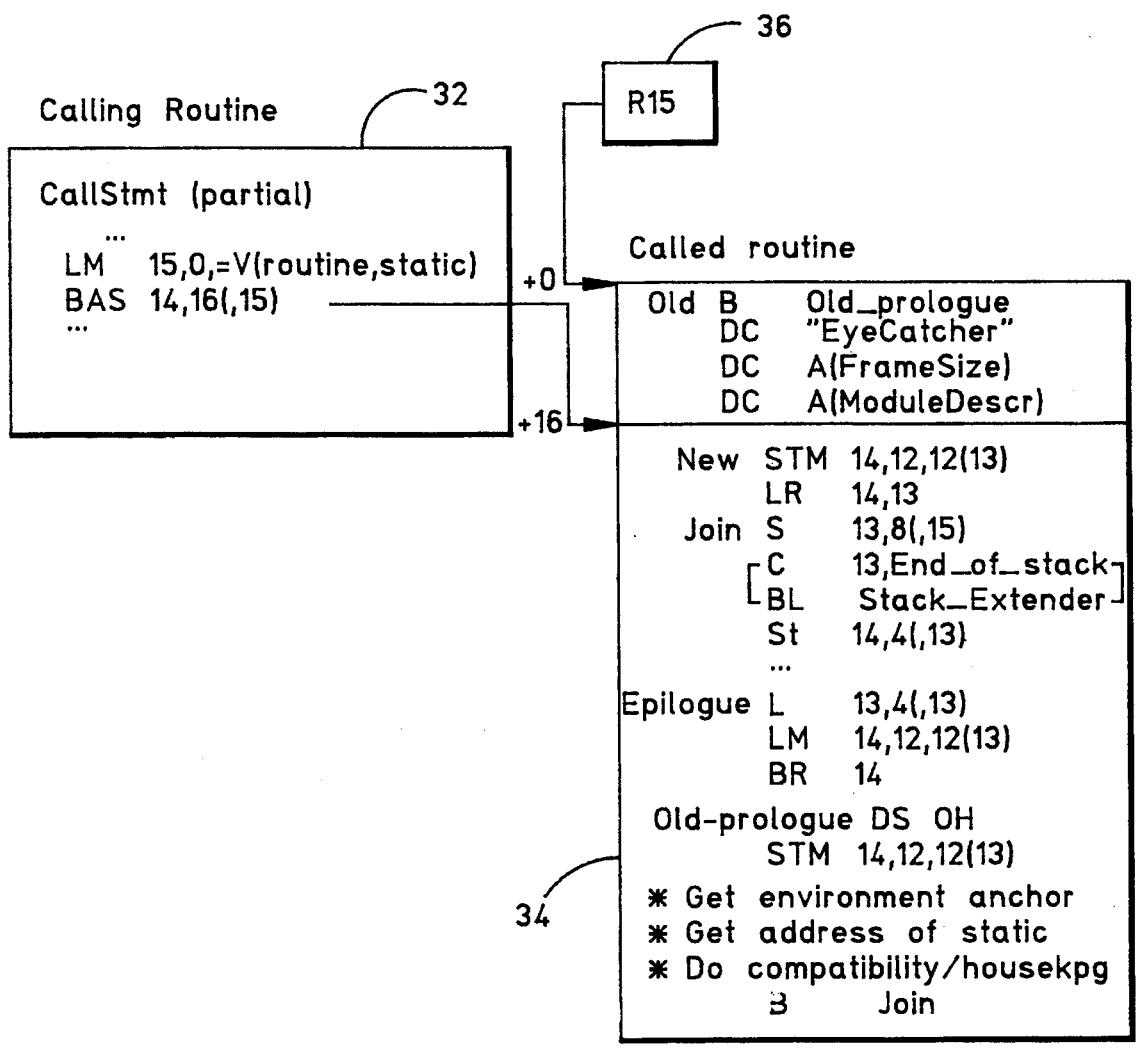
FIG. 3 is a detailed illustration of the embodiment from FIG. 2.

Exemplary code sequences, including entry registers 36, are now discussed for "non-Leaf" routines. As used herein, a non-Leaf routine may either be the receiver of a procedural call or a calling routine. FIG. 3 illustrates the exemplary embodiment of FIG. 2 in more detail. The elements of called routine 34 can be Understood with reference to Table 4 below for non-Leaf routines.

Table 4 below provides an exemplary code sequence for an OPLINK Public non-Leaf routine, including entry register contents.

TABLE 4

OPLINK Linkage Convention

| CEE to CEE | | | Non-CEE to CEE | | | |
|---|---|---|---|---|---|---|
| R0 | => | Static | R0 | | Undefined, not preserved | |
| R1 | => | Argument List | R1 | => | Arg list | |
| R2–R11 | | Undefined, must be preserved | R2–R11 | | Undefined, preserved | |
| R12 | => | CAA | R12 | | Undefined, preserved | |
| R13 | => | CEE stack frame | R13 | => | OS save area | |
| R14, R15 | | Linkage registers | R14, R15 | | Linkage registers | |
| Caller: | | | | | | |
| | LM | 15,0,=V(routine | L | | 15,=V(routine | 1 |
| | BAS | 14,16(,15) | BALR | | 14,15 | 2 |
| Callee: | | | | | | |
| OLD | DS | 0D | | | Entry point for OLD to CEE | 3 |
| | B | OLDPROLG-OLD(,15) | | | Handle old module entry conventions | 4 |
| | DS | A(CEEMARK) | | | CEE eye catcher | 5 |
| | DS | A(SIZE) | | | Size of stack frame | 6 |
| | DS | A(PPA1-OLD) | | | Offset to Description | 7 |
| NEW | DS | 0D | | | | 8 |
| | STM | 14,12,12(13) | | | Store caller's registers | 9 |
| | LR | 14,13 | | | A(caller's stack frame) | 10 |
| JOIN | DS | 0H | | | OLD prolog/ STKXTND rejoins | 11 |
| | S | 13,8(,15) | | | A(new stack frame) | 12 |
| | C | 13,STKEND-CAA(,12) | | | Check for end of stack | 13 |
| | BL | STKXTND-CAA(,12) | | | Extend stack | 14 |
| | ST | 14,4(,13) | | | Back pointer | 15 |
| EPILOG | L | 13,4(,13) | | | A(caller's save area) | 16 |

TABLE 4-continued

OPLINK Linkage Convention

|  | LM | 14,12,12(13) | Restore registers | 17 |
|---|---|---|---|---|
|  | BR | 14 | Return to caller | 18 |
| OLDPROLG | DS | 0H |  | 19 |
|  | STM | 14,12,12(13) | Store caller's registers | 20 |
| * |  | Obtain the address of the CAA |  | 21 |
| * |  | Obtain the address of this routine's static |  | 22 |
|  | LR | 14,13 | A(caller's save area) | 23 |
|  | L | 13,STKPTR-CAA(,12) | Current low water mark in CAA STK | 24 |
|  | B | JOIN | Join NEW prologue | 25 |

The decision to improve the CEE-enabled path length at the expense of the non-CEE enabled path length is left to the individual high-level languages. Line 21 in Table 4 is environment-dependent code suitable for obtaining the address of the CAA. Line 22 in Table 4 is a call to a program management service that finds the address of this routine's static data. Note that the exemplary code sequences in Table 4 describes a CEE-enabled routine that may be called from another CEE-enabled routine at offset +16B or from a non-CEE-enabled routine at offset +0B. CEE-enabled routines may also need to call non-CEE-enabled routines. Unless directed by a pragma or directive, however, CEE-enabled compilers must generate calls that enter the called routine at offset +16B. In such cases, the mismatch between the caller and callee is detected at bind time and glue code is inserted between the routines to resolve the mismatch. This glue code requires more than merely adjusting the entry point offset to +0B. Individual high-level languages may choose to implement a pragma or directive instructing the compiler to generate a tailored call to a non-CEE-enabled routine, thereby avoiding the glue code insertion.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A method of processing procedure calls to executable program objects in a computer-implemented data processing system from a calling program object of the system to a called program object of the system, the called program object having an executable main code procedure and the calling program object specifying a named entry-point address in the called program object, the method comprising the steps of:

generating a procedure call from the calling program object that specifies the entry-point address in the called program object and an offset from the entry-point address, the offset selecting between one of at least a first offset and a second offset, wherein the first offset selects an executable first prologue procedure of the called program object that is associated with a first main code linkage protocol and the second offset selects an executable second prologue procedure of the called program object that is associated with a second main code linkage protocol;

beginning execution of the called program object with an instruction at the selected prologue procedure of the specified offset to thereby process the procedure call according to the linkage protocol of the selected prologue procedure; and executing the main code procedure in accordance with the linkage protocol.

2. A method as defined in claim 1, wherein the step of beginning execution comprises the steps of:

executing the first prologue procedure in response to a procedure-call-specified zero offset value, thereafter executing a branch instruction to the main code procedure; and executing the second prologue procedure in response to a procedure-call-specified non-zero offset value, thereafter executing the main code procedure.

3. A method as defined in claim 2, wherein the step of executing the first prologue procedure comprises:

executing a branch instruction at the zero offset that causes a branching to the first prologue procedure at another address.

4. A method as defined in claim 1, wherein the step of beginning execution comprises the steps of:

branching from execution of the first prologue procedure to execution of the main code procedure in response to completion of the first prologue procedure; and initiating execution of the main code procedure immediately upon completion of the second prologue procedure.

5. A computer-implemented data processing system including memory means for storing a plurality of program objects such that calling program objects generate procedure calls to called program objects, each called program object having at least one executable main code procedure whose execution is initiated in response to a procedure call from a calling program object, wherein each called program object stored in the memory means further comprises:

named entry-point address means for identifying a memory means address to a data processing system linkage editor that performs operations necessary to link the called program object with a calling program object;

first executable prologue procedure means for processing the procedure call according to a first linkage protocol, wherein the first executable prologue procedure means is processed in response to a first offset relative to the memory means address that is specified in the procedure call from the calling program object; and second executable prologue procedure means for processing the procedure call according to a second linkage protocol, wherein the second executable prologue procedure means is processed in response to a second offset relative to the memory means address that is specified in the procedure call from the calling program object.

6. A data processing system as defined in claim 5, wherein:

the first executable prologue procedure means comprises instructions stored in the memory means at a first offset from the named entry-point memory means address; and the second executable prologue procedure means comprises instructions stored in the memory means at a second offset from the named entry-point memory means address.

7. A data processing system as defined in claim 6, wherein the first executable prologue procedure means further comprises a branch instruction stored at the zero offset that causes branching to a prologue procedure for a first programming language and the second prologue procedure comprises a prologue procedure for a second programming language.

8. A data processing system as defined in claim 6, wherein the first prologue procedure comprises processing steps for procedure calls from a first operating system of the data processing system and the second prologue procedure comprises processing steps for procedure calls from a second operating system.

* * * * *